July 1, 1952  C. N. OAKES  2,601,751
STALK CUTTER

Filed June 29, 1948  2 SHEETS—SHEET 1

INVENTOR.
CLYDE N. OAKES,
BY
McMorrow, Berman & Davidson
ATTORNEYS.

INVENTOR.
CLYDE N. OAKES,
BY
McMorrow, Berman & Davidson
ATTORNEYS.

Patented July 1, 1952

2,601,751

UNITED STATES PATENT OFFICE 2,601,751

STALK CUTTER

Clyde N. Oakes, Boonville, N. C.

Application June 29, 1948, Serial No. 35,751

3 Claims. (Cl. 55—61)

This invention relates to mowers and is more particularly directed to an attachment for removably attaching a cutter reel to a tractor.

An object of the invention is the provision of a frame which may be attached to or detached readily from a tractor, means for suspending the frame from the tractor and below the main body of said tractor so that a reel will be projected forwardly thereof whereby it will be possible to cut close to trees, hedges and fences.

Another object of the invention is the provision of a frame which may be attached readily to conventional elements of a tractor for supporting a reel forwardly of the tractor so that it will not only be possible to cut close to fences and hedges but the crop will be cut in advance of the oncoming tractor, the supporting elements of the reel being cushioned and adapted to be raised when desired.

A further object of the invention is the provision of a detachable frame for a tractor carrying a tiltable supporting means for a conventional cutter reel, said supporting means being rocked manually to raise the reel to an inoperative position above the ground and for projecting the reel forwardly of the tractor, the front end of the frame being adjustable vertically for properly positioning the reel above the ground.

The invention is best understood from a consideration of the following detailed description in connection with the accompanying drawings, nevertheless, it is to be understood that the invention is not confined to the disclosure but is susceptible of such changes and modifications as shall define no material departure from the salient features of the invention as expressed in the appended claims.

Figure 1:
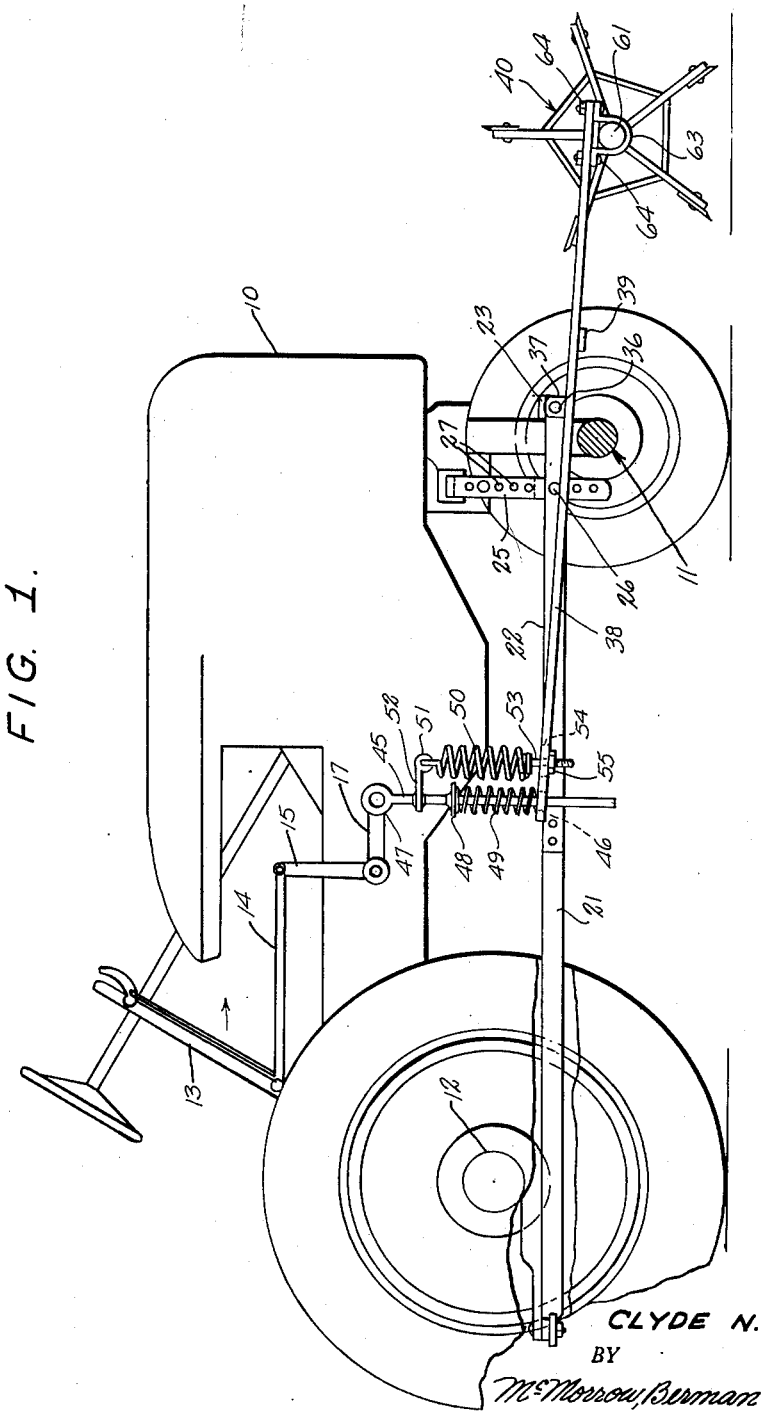
Figure 1 is a longitudinal side view in elevation of my frame for supporting a reel forwardly of a tractor and shown applied to the tractor.

Referring more particularly to the drawings, 10 designates a tractor having a front axle 11 and a rear axle housing 12. A rack and pawl-controlled lever 13 is pivoted on the tractor adjacent the driver's seat. A link 14 connects the lever 13 with a lever 15 projecting upwardly from a rack shaft 16 having cranks 17 at its opposite ends. The shaft is mounted in bearings 18.

A frame generally designated by the numeral 20 consists of a longitudinal beam 21, brace bars 22 and an end bar 23. The outer ends of the brace bars are welded to the ends of the bar 23 and are bent inwardly and bolted at 24 to an intermediate portion of the beam 21. A vertical bar 25 of a hanger is attached to each brace bar by a bolt 26 inserted through a perforation in the brace bar and through one of a plurality of perforations 27 in the vertical bars. By this means, the front of the frame 20 may be raised or lowered as desired. The rear end of the beam has a hitch plate 30 secured thereto. Two openings are formed in the plate to receive bolts 31 for attaching said plate to the draw bar 32 of the tractor. The vertical bars 25 of the hangers have right angular extensions 33 adapted to be attached to the usual attaching brackets found on the body frame of certain types of tractors. Thus it will be seen that the frame 20 is fixed securely in position underneath of the tractor 10.

Figure 2:
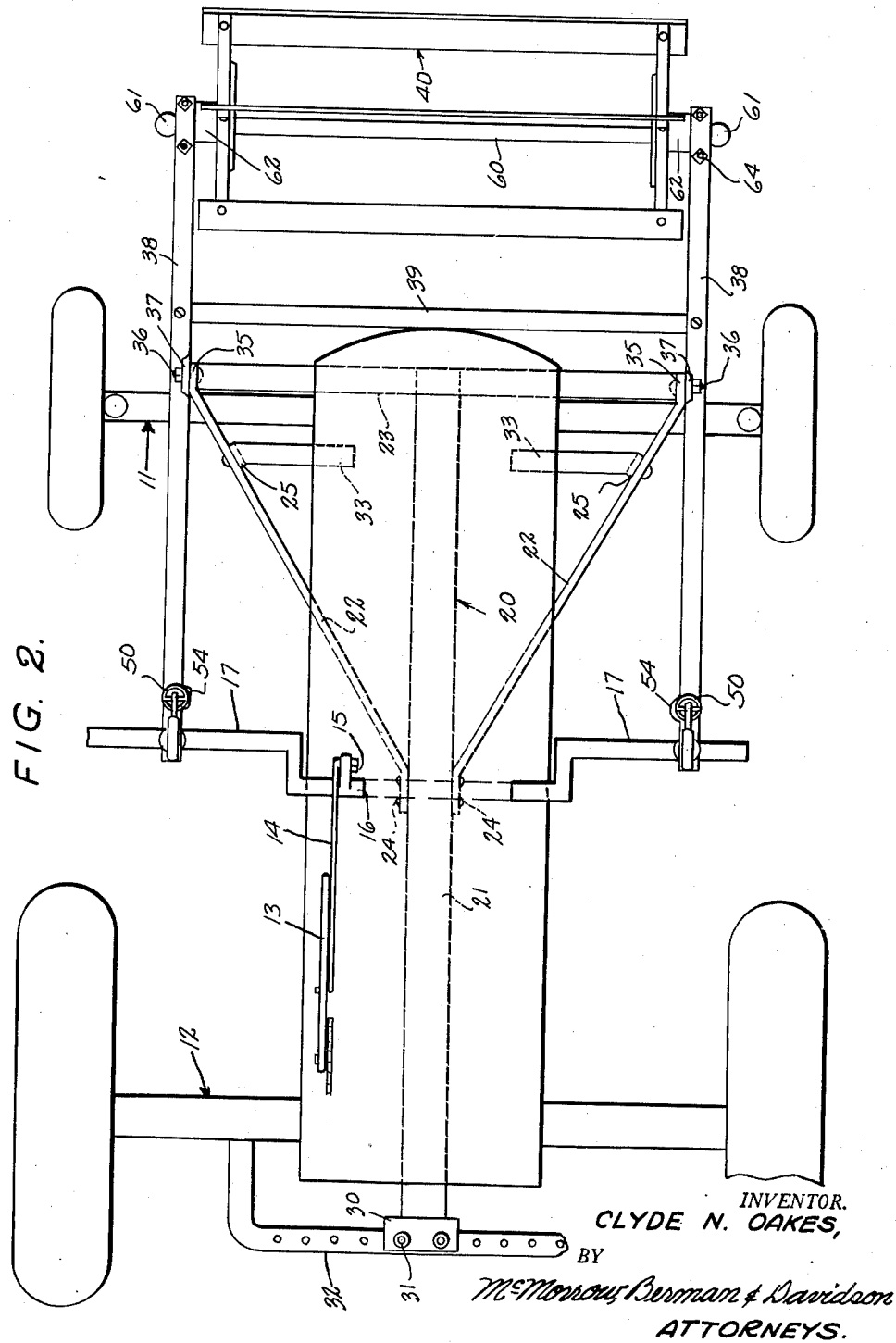
Figure 2 is a plan view of the frame.

It will be noted from Figure 2 that the extreme forward ends 35 of the brace bars 22 are bent parallel to the beam 20 and these ends are provided each with a perforation to receive a bolt 36 which also is received by a perforation in a flange 37 on each of a pair of oscillatable lifting bars 38 for pivotally connecting the lifting bars 38 to the frame 20. A transverse brace bar 39 connects the bars 38 rigidly together outwardly of the bar 23 to provide a means for supporting a reel 40 forwardly of the tractor.

A bolt 45 is slidably mounted in a passage 46 in the inner end of each of the lifting bars 38. A bearing 47 on the upper end of each bolt is received by the adjacently-disposed crank 17 of the shaft 16. A collar 48 is rigid with the upper end of each bolt below the bearings 47. A coil spring 49 is received by each bolt and has one end in engagement with the collar while the other end is seated on the inner end of a lift bar 38. The springs resist downward movements of the bolts 45 and also act to force the inner ends of said lift bars downwardly when the cranks 17 are lowered by the lever 13 as will be presently explained.

A second coil spring 50 has one end secured in an eye 51 on the end of a bracket 52 rigid with each bolt 45 above the collar 48. The lower end of said spring is attached to a bolt 53 received by a perforation in an extension 54 on the inner end of each lifting bar 38 adjacent the spring 49. A nut 55 threaded onto the bolt 53 below the extension 54 may be adjusted for maintaining the proper tension on the spring 50. There is a balancing spring 50 for each lifting bar as shown in Figure 2, and they relieve shocks to the cutter reel 40 and retain said reel in the ground. The springs also permit the lift bars 38 to oscillate when the cutter is in motion.

The reel 40 has a longitudinal axial shaft 60 supported at its ends by pintles 61 which are mounted in bearings 62. These bearings are secured to the outer ends of the reel-lifting bars 38 by clamps 63 bolted at 64 to said bars.

When it is desired to raise the reel 40 for clearing an obstruction or for traveling from one field to another or over a highway, the lever 13 is shifted forwardly thereby rocking the shaft 16 and the cranks 17 in the direction indicated by the arrow in Figure 1. As the cranks are lowered further, the inner ends of the lifting bars 38 are depressed by the bolts 45 and springs 49, thereby raising the outer ends of the bars and likewise the reels. Said bars pivoting on the bolts 36 at the front end of the stationary frame 20.

The reel 40 is positioned in the ground by moving the lever 13 in a direction which is opposite to that indicated by the arrow in Figure 1. At this time the bolts 45 are raised with the springs 50 pulling on the inner ends of the lifting arms or bars 38 thereby rocking said arms on the pivots 36 and lowering the outer ends thereof for adjustably positioning the reel 40 toward the ground.

During the operation of the conventional stalk cutter, the springs 50 will permit the lifting bars to raise but they will at times act as a counter-balance for stabilizing the lifting bars and for maintaining the reel 40 in the ground. These springs further pull downwardly on the bolts 45 against the tension of the springs 49 and aid in maintaining the bolts in the passages 46 in the inner ends of the bars 38. The passages 46 have a greater diameter than the bolts 45 to permit said bolts to rock at an angle to the vertical during the operations of the cranks 17 which move through an arc of a circle.

The stalk-cutting reel 40 is positioned forwardly of the tractor for cutting the stalks before they hit the tractor, the cutting reel engaging the stalks, bending them into engagement with the ground to be there severed and cut by the downwardly-pressed cutting reel.

It is to be borne in mind that the position of the reel 40 relative to its height above the ground is varied initially by adjusting the normally fixed position of the front end of the frame 20 on the tractor. This is accomplished by changing the bolts 26 to a higher or lower perforation 27 in the bars 25.

What I claim is:

1. In a cutter reel attachment, a longitudinal frame adapted to be positioned underneath the body frame of a tractor and having one end adapted for attachment to the draw bar of said tractor, a rotatable shaft arranged transversely of and spaced above said longitudinal frame intermediate the ends of the latter, a pair of bars positioned longitudinally of said frame adjacent the other end thereof and pivotally connected intermediate their ends to said frame, a cutter positioned intermediate the outer ends of said bars and rotatably supported therein, a vertically disposed bolt positioned adjacent to and slidably extending through the inner end of each of said bars and having the upper end connected to said shaft, and a coiled spring circumposed about each of said bolts and having one end fixedly connected to the bolt adjacent its upper end and having the other end bearing against the adjacent bar for urging said bars downwardly.

2. In a cutter reel attachment, a longitudinal frame adapted to be positioned underneath the body frame of a tractor and having one end adapted for attachment to the draw bar of said tractor, a rotatable shaft arranged transversely of and spaced above said longitudinal frame intermediate the ends of the latter, a pair of bars positioned longitudinally of said frame adjacent the other end thereof and pivotally connected intermediate their ends to said frame, a cutter positioned intermediate the outer ends of said bars and rotatably supported therein, a vertically disposed bolt positioned adjacent to and slidably extending through the inner end of each of said bars and having the upper end connected to said shaft, a first coiled spring circumposed about each of said bolts and having one end fixedly connected to the bolt adjacent its upper end and having the other end bearing against the adjacent bar for urging said bars downwardly, a horizontally disposed bracket having one end secured to each of said bolts above and spaced from the connection of said first spring, and a second coiled spring arranged in parallel spaced relation with respect to each of said first coiled spring and having one end connected to the other end of the adjacent bracket and having the other end adjustably connected to the adjacent bar for counterbalancing said first named coiled spring.

3. In a cutter reel attachment, a longitudinal frame adapted to be positioned underneath the body frame of a tractor and having one end adapted for attachment to the draw bar of said tractor, a rotatable shaft ararnged transversely of and spaced above said longitudinal frame intermediate the ends of the latter, a pair of bars positioned longitudinally of said frame adjacent the other end thereof and pivotally connected intermediate their ends to said frame, a cutter positioned intermediate the outer ends of said bars and rotatably supported therein, hanger means adapted to be dependingly supported from said body frame and adjustably secured to said longitudinal frame for selectively positioning said longitudinal frame with respect to said body frame, a vertically disposed bolt positioned adjacent to and slidably extending through the inner end of each of said bars and having the upper end connected to said shaft, a first coiled spring circumposed about each of said bolts and having one end fixedly connected to the bolt adjacent its upper end and having the other end bearing against the adjacent bar for urging said bars downwardly, a horizontally disposed bracket having one end secured to each of said bolts above and spaced from the connection of said first spring, and a second coiled spring arranged in parallel spaced relation with respect to each of said first coiled spring and having one end connected to the other end of the adjacent bracket and having the other end adjustably connected to the adjacent bar for counterbalancing said first named coiled spring.

CLYDE N. OAKES.

REFERENCES CITED

The following references are of record in the file of this patent:

UNITED STATES PATENTS

| Number | Name | Date |
|---|---|---|
| 796,811 | Coldwell | Aug. 8, 1905 |
| 957,660 | Delano | May 10, 1910 |
| 1,111,757 | Nilson | Sept. 29, 1914 |
| 1,553,462 | Newton | Sept. 15, 1925 |
| 1,810,061 | Sims et al. | June 16, 1931 |
| 2,138,711 | Rohwer | Nov. 29, 1938 |
| 2,238,840 | Weishaar | Apr. 15, 1941 |